United States Patent
Thonet et al.

(10) Patent No.: US 12,399,945 B2
(45) Date of Patent: Aug. 26, 2025

(54) JOINT PERSONALIZED SEARCH AND RECOMMENDATION WITH HYPERGRAPH CONVOLUTIONAL NETWORKS

(71) Applicant: NAVER CORPORATION, Gyeonggi-do (KR)

(72) Inventors: Thibaut Thonet, Grenoble (FR); Jean-Michel Renders, Quaix en Chartreuse (FR)

(73) Assignee: NAVER CORPORATION, Gyeonggi-Do (KR)

( * ) Notice: Subject to any disclaimer, the term of this patent is extended or adjusted under 35 U.S.C. 154(b) by 318 days.

(21) Appl. No.: 17/882,922

(22) Filed: Aug. 8, 2022

(65) Prior Publication Data
US 2023/0195809 A1      Jun. 22, 2023

(30) Foreign Application Priority Data
Dec. 22, 2021   (EP) ..................................... 21306907

(51) Int. Cl.
*G06F 16/9535*   (2019.01)
*G06F 18/214*   (2023.01)
*G06N 3/045*   (2023.01)

(52) U.S. Cl.
CPC ...... *G06F 16/9535* (2019.01); *G06F 18/2155* (2023.01); *G06N 3/045* (2023.01)

(58) Field of Classification Search
CPC ............. G06F 16/9535; G06F 16/9536; G06F 16/9538; G06F 16/951; G06N 3/045; G06N 3/0455; G06N 3/0464
See application file for complete search history.

(56) References Cited

U.S. PATENT DOCUMENTS

2019/0188295 A1   6/2019   Sirotkovic et al.
2021/0256368 A1*  8/2021   Payne ....................... G06N 3/04

FOREIGN PATENT DOCUMENTS

GB          2593963 A           10/2021

OTHER PUBLICATIONS

Junliang Yu et al. 2021. Self-Supervised Multi-Channel Hypergraph Convolutional Network for Social Recommendation. In Proceedings of the Web Conference 2021 (WWW '21). Association for Computing Machinery, New York, NY, USA, 413-424. (Year: 2021).*

(Continued)

*Primary Examiner* — Kris E Mackes

(57) ABSTRACT

A method of training a hypergraph convolutional network (HGCN) includes: receiving training data including search instances and recommendation instances; constructing a hypergraph from the training data, where each node of the hypergraph represents one of a user profile, a query term, and a content item, and where the hypergraph represents each of the search instances and each of the recommendation instances as a hyperedge linking corresponding ones of the nodes; initializing base embeddings associated with the hypergraph nodes; propagating the base embeddings through one or more convolutional layers of the HGCN to obtain, for each of the convolutional layers, respective embeddings of the nodes of the hypergraph; computing, based on the base embeddings and the respective embeddings obtained from each of the one or more convolutional layers: a first loss; and a second loss; and selectively updating ones of the base embeddings based on the first and second losses.

24 Claims, 7 Drawing Sheets

(56) References Cited

OTHER PUBLICATIONS

H. Shi et al., "Hypergraph-Induced Convolutional Networks for Visual Classification," in IEEE Transactions on Neural Networks and Learning Systems, vol. 30, No. 10, pp. 2963-2972, Oct. 2019. (Year: 2019).*
Thibaut Thonet and Jean-Michel Renders, "Joint Personalized Search and Recommendation with Hypergraph Convolutional Networks", Association for Computing Machinery; CIKM '21, Nov. 1-5, 2021.
Bai S. et al. in "Hypergraph Convolution and Hypergraph Attention" (*Pattern Recognition* 110 (2021), 1-30).
Chandra, Ed H. Chi, Wen Li, Ankit Kumar, Xiang Ma, Alex Soares, Nitin Jindal, and Pei Cao. 2020. Zero-Shot Heterogeneous Transfer Learning from Recommender Systems to Cold-Start Search Retrieval. In CIKM. 2821-2828.
Chi, Wen Li, Ankit Kumar, Xiang Ma, Alex Soares, Nitin Jindal, and Pei Cao. 2020. Zero-Shot Heterogeneous Transfer Learning from Recommender Systems to Cold-Start Search Retrieval. In CIKM. 2821-2828.
FastText: Library for efficient text classification and representation learning. 2022; Accessed Oct. 4, 2022. https://fasttext.cc/.
Felix Wu, Tianyi Zhang, Amauri Holanda de Souza, Christopher Fifty, Tao Yu, and Kilian Q. Weinberger. 2019. Simplifying Graph Convolutional Networks. In ICML. 11884-11894.
Huifeng Guo, Ruiming Tang, Yunming Ye, Zhenguo Li, and Xiuqiang He. 2017. DeepFM: A Factorization-Machine based Neural Network for CTR Prediction. In IJCAI. 1725-1731.
Jianling Wang, Kaize Ding, Liangjie Hong, Huan Liu, and James Caverlee. 2020. Next-item Recommendation with Sequential Hypergraphs. In SIGIR. 1101-1110.
Jianling Wang, Kaize Ding, Ziwei Zhu, and James Caverlee. 2021. Session-based Recommendation with Hypergraph Attention Networks. In SDM. 82-90.
KoNLPy: KoNLPy: Korean NLP in Python; 2014-2022; accessed: Oct. 4. 2022 https://konlpy.org/en/latest.
Kyung-Min Kim, Donghyun Kwak, Hanock Kwak, Young-Jin Park, Sangkwon Sim, Jae-Han Cho, Minkyu Kim, Jihun Kwon, Nako Sung, and Jung-Woo Ha. 2019. Tripartite Heterogeneous Graph Propagation for Large-scale Social Recommendation. In RecSys: Late-Breaking Results. 56-60.
Lei Chen, Le Wu, Richang Hong, Kun Zhang, and Meng Wang. 2020. Revisiting Graph based Collaborative Filtering: A Linear Residual Graph Convolutional Network Approach. In AAAI. 27-34.
Lei Li et al.: "News recommendation via hypergraph learning", Web Search and Data Mining, ACM, XP058050277; Feb. 4, 2013.
Nitish Srivastava, Geoffrey Hinton, Alex Krizhevsky, Ilya Sutskever, and Ruslan Salakhutdinov. 2014. Dropout: A Simple Way to Prevent Neural Networks from Overfitting. Journal of Machine Learning Research 15, 1 (2014), 1929-1958.
Norbert Fuhr. 2017. Some Common Mistakes in IR Evaluation, and How They Can Be Avoided. ACM SIGIR Forum 51, 3 (2017), 32-41.
Rex Ying, Ruining He, Kaifeng Chen, Pong Eksombatchai, William L. Hamilton, and Jure Leskovec. 2018. Graph Convolutional Neural Networks for Web-scale Recommender Systems. In KDD. 974-983.
Rong Y et al., DropEdge: Towards deep Graph Convolutional Networks on Node Classification, ICLR, 2020).
Ruqing Zhang, Jiafeng Guo, Yixing Fan, Yanyan Lan, and Xueqi Cheng. 2020. Query Understanding via Intent Description Generation. In CIKM. 1823-1832.
Shiwen Wu, Wentao Zhang, Fei Sun, and Bin Cui. 2020. Graph Neural Networks in Recommender Systems: A Survey. arXiv:2011.02260 (2020).
Song Bai, Feihu Zhang, and Philip H.S. Torr. 2021. Hypergraph Convolution and Hypergraph Attention. Pattern Recognition 110 (2021), 1-30.
Sparck Jones K. et al., "A Probabilistic Model of Information retrieval: Development and Comparative Experiments—Part 2", *Information processing and Management* 36, 6, (2000), 809-840).
Srivastava N et al., "Dropout: A Simple Way to Prevent Neural networks from Overfitting", *Journal of Machine Learning Research* 15, 1 (2014), 1929-1958).
Steffen Rendle, Christoph Freudenthaler, Zeno Gantner, and Lars Schmidt-Thieme. 2009. BPR: Bayesian Personalized Ranking from Implicit Feedback. In UAI. 452-461.
Steffen Rendle, Walid Krichene, Li Zhang, and John Anderson. 2020. Neural Collaborative Filtering vs. Matrix Factorization Revisited. arXiv:2005.09683 (2020).
Steffen Rendle. 2010. Factorization Machines. In ICDM. 995-1000.
F. Maxwell Harper and Joseph A. Konstan. 2015. The MovieLens Datasets: History and Context. ACM Transactions on Interactive Intelligent Systems (TiiS) 5, 4: 19:1-19:19. https://doi.org/10.1145/2827872; The MovieLens-25M version (https://grouplens.org/datasets/movielens/25m/).
Thorsten Joachims, Adith Swaminathan, and Tobias Schnabel. 2017. Unbiased Learning-to-Rank with Biased Feedback. In WSDM. 781-789.
Wang J. et al. ("Session-based Recommendation with Hypergraph Attention Networks", SDM, 82-90, 2021).
Wang J. et al., "Next-item Recommendation with Sequential Hypergraphs", SIGIR, 1101-1110, 2020.
William L. Hamilton, Rex Ying, and Jure Leskovec. 2017. Inductive Representation Learning on Large Graphs. In NeurIPS. 1025-1035.
Wu T. et al., "Zero-Shot Heterogeneous Transfer Learning from Recommender Systems to Cold-Start Search Retrieval", CIKM, 2821-2828, 2020).
Xiang Wang, Hongye Jin, An Zhang, Xiangnan He, Tong Xu, and Tat-Seng Chua. 2020. Disentangled Graph Collaborative Filtering. In SIGIR. 1001-1010.
Xiang Wang, Xiangnan He, Meng Wang, Fuli Feng, and Tat Seng Chua. 2019. Neural Graph Collaborative Filtering. In SIGIR. 165-174.
Xiangnan He, Kuan Deng, Xiang Wang, Yan Li, Yongdong Zhang, and Meng Wang. 2020. LightGCN: Simplifying and Powering Graph Convolution Network for Recommendation. In SIGIR. 639-648.
Yehuda Koren, Robert M. Bell, and Chris Volinsky. 2009. Matrix Factorization Techniques for Recommender Systems. Computer 42, 8 (2009), 30-37.
Yifan Feng, Haoxuan You, Zizhao Zhang, Rongrong Ji, and Yue Gao. 2019. Hypergraph Neural Networks. In AAAI. 3558-3565.
Yihe Dong, Will Sawin, and Yoshua Bengio. 2020. HNHN: Hypergraph Networks with Hyperedge Neurons. arXiv:2006.12278 (2020).
Ying R. et al., "Graph Convolutional Neural Networks for Web-scale Recommender Systems", KDD, 974-983, 2018).
Yongfeng Zhang, Xu Chen, Qingyao Ai, Liu Yang, and W. Bruce Croft. 2018. Towards Conversational Search and Recommendation: System Ask, User Respond. In CIKM. 177-186.
Yu Rong, Wenbing Huang, Tingyang Xu, and Junzhou Huang. 2020. DropEdge: Towards Deep Graph Convolutional Networks on Node Classification. In ICLR.
Zamani et al. in Joint Modeling and Optimization of Search and Recommendation, *DESIRES*, 36-41, 2018.
Zamani H. et al., "Learning a Joint Search and Recommendation Model from User-Item Interactions", WSDM, 717-725, 2020).
Zhicheng Dou and Jiafeng Guo. 2020. Query Intent Understanding. Springer International Publishing, 69-101.
European Search Report for European Application No. 21306907.3 dated Apr. 7, 2022.

* cited by examiner

JOINT PERSONALIZED SEARCH AND RECOMMENDATION WITH HYPERGRAPH CONVOLUTIONAL NETWORKS

CROSS-REFERENCE TO RELATED APPLICATIONS

This application claims the benefit of European Application No. 21306907.3, filed on Dec. 22, 2021. The entire disclosure of the application referenced above is incorporated herein by reference.

FIELD

The present disclosure relates to content retrieval in the context of both search and recommendation. In particular, the present disclosure relates to the use of neural networks for recommending content items to a user and to providing content items in response to receiving a user search query.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

While Information Retrieval (IR) and Recommender Systems (RS) have long been regarded as two distinct facets of the information filtering problem, this distinction is becoming increasingly blurred. For instance, numerous e-commerce platforms offer users hybrid ways of exploring a large base of heterogeneous items, by deploying a combination of search and recommendation tools to accurately identify what users need or prefer in a vast maze of possibilities.

The emergence of mixed-initiative conversational agents and chatbots is another example of applications where IR and RS steps are intimately connected to solve a joint session-based objective. Roughly speaking, IR and RS tasks mainly differ by the presence of a query: IR methods may be considered content-based methods and involve a query understanding or query representation step, in order to effectively match the query with the indexed items. RS methods do not use any query information, and involve the knowledge of the recommendation context and past user history to score the indexed items.

Search and recommendation tasks may be performed separately, by distinct models. The Joint Personalized Search and Recommendation (JPSR) task, however, involve ranking a list of items by decreasing order of relevance to user needs or preferences in a given context. For this task, some instances are triggered by a given query (search instances, initiated by the user), while others may not be associated with any query (recommendation instances, initiated by the system).

The problem of unifying search and recommendation through a single model has been studied in only a very few works. Works regarding the Joint Search and Recommendation (JSR) model include Zamani H. et al., Learning a Joint Search and Recommendation Model from User-Item Interactions, *WSDM*, 717-725, 2020, and Zamani et al. in Joint Modeling and Optimization of Search and Recommendation, *DESIRES*, 36-41, 2018. A multi-task model may be made of a retrieval component and a recommendation component. This may, however, items being associated with a text document because the task tackled by JSR may assume that items are associated with a text description. Additionally, ignored may be the dependency between users and queries, which is crucial to provide personalized results. Moreover, JSR may not learn query term embeddings, but involve pre-trained word embeddings and may not exploit multi-hop user/item neighborhoods using (hyper-)GNN techniques. Instead, JSR scores users and items using stacked fully-connected layers which may be oblivious of the neighborhood information. Finally, at inference time, JSR may use distinct techniques to accomplish the recommendation and retrieval cases, and may not exploit user embeddings for retrieval.

Graph Neural Networks (GNNs) may be used for recommendation tasks, such as Collaborative Filtering (CF) problems, where the interactions between users and items are considered (e.g., ratings, clicks, views, purchases, etc.). GNNs may combine the expressive power of deep neural networks with the exploitation of structural information given by an underlying graph, by propagating and smoothing node information through convolution operations. This results in higher-level, graph-contextualized node embeddings that may then used to solve a final task.

CF problems may involve two-way interactions, such as interactions over (e.g., user, item) pairs. These interactions can be represented as edges, possibly weighted, on a bipartite graph. When considering n-way interactions with n>2, such as search instances where the outcome of the interaction over a (user, item, query) triplet is observed, bipartite graphs may not be adopted.

Hypergraph neural networks (HGNN) extend GNN techniques to hypergraphs. This may be applied to problems including node classification, next-item recommendation.

SUMMARY

Further areas of applicability of the present disclosure will become apparent from the detailed description, the claims and the drawings. The detailed description and specific examples are intended for purposes of illustration only and are not intended to limit the scope of the disclosure.

The present disclosure addresses the problem of unifying search and recommendation tasks, such as the Joint Personalized Search and Recommendation (JPSR) problem. To tackle this problem, HyperSaR is a hypergraph convolutional approach for search and recommendation. HyperSaR provides a unique model for the two tasks that takes into account all available information. This is particularly appealing to platforms that offer search and recommendation services to a shared user base over common items. Such platforms may then deploy and maintain only one algorithm instead of two, which results in more streamlined solutions and fewer associated costs and a better computing system and content provision system. Training on user identification data, content items interacted on by the user, and queries input by the user enables more accurate modeling of the users and items due to the increased volume and diversity of exploitable information.

From the interaction data, HyperSaR first builds a hypergraph including user identification data (such as a user profile), item and query term nodes in which recommendation instances form user-item edges and search instances define user-item-query hyperedges. To train the HyperSaR network, whose parameters include (e.g., only) the base (aka 'layer-0') embeddings of the hypergraph nodes, the embeddings are propagated using hypergraph convolution and form the training loss as a combination of two complementary objectives. The first objective involves assessing the probability of an interaction, while the second objective involves predicting the query of a search interaction for a given pair (e.g., user, item).

In a feature, there is provided a computer-implemented method of training a hypergraph convolutional network, HGCN, to retrieve content items. The method includes receiving training data including a plurality of search instances and a plurality of recommendation instances, where each search instance comprises a user profile, a query including one or more query terms and a content item, and where each recommendation instance includes a user profile and a content item. The method further includes constructing a hypergraph from the training data, where each node of the hypergraph represents a user profile, a query term or a content item, and where the hypergraph represents each of the plurality of search instances and each of the plurality of recommendation instances as a hyperedge linking corresponding nodes; randomly initializing the base embeddings associated with the hypergraph nodes to constitute the base layer of the HGCN. The method further includes propagating the base embeddings through one or more convolutional layers of the HGCN to obtain, for each of the convolutional layers, respective embeddings of the nodes of the hypergraph; computing, based on an aggregation of the base embeddings and the respective embeddings obtained from each of the convolutional layers, a first loss based on a prediction of an item given a corresponding user profile and query and a second loss based on a prediction of a query given a corresponding user profile and content item; and updating the base embeddings of the HGCN based on a combination of the first loss and the second loss.

One technical advantage of the method is to enable the training of a single neural network model using both search instances and recommendation instances. This results in a trained model that unifies both search and recommendation tasks. Accordingly, when deployed in real-world scenarios, only one algorithm is deployed and maintained for both search and recommendation, thereby reducing costs and providing an improved computing system and content provision system. Because the model is trained on both search and recommendation data, the model can be fed with more data than non-unified search approaches and recommendation approaches. Having access to more data therefore means more accurate modeling.

In further features, the method may further include aggregating the base embeddings and the respective embeddings obtained from each of the convolutional layers using a convex combination of the embeddings.

In further features, computing the first loss may include computing a query embedding from a sum of the embeddings of the query terms. The first loss may be computed using a Bayesian Personalized Ranking loss or a pointwise cross-entropy loss.

In further features, the second loss may be a sum of a loss associated with a prediction of a query given a corresponding user profile and a loss associated with a prediction of the query given a corresponding content item.

In further features, the base embeddings may include, for each of the plurality of recommendation instances, an all-zero vector representing an absent query for the plurality of recommendation instances. In further features, the base embeddings may include, for each of the plurality of recommendation instances, an embedding representing an absent query, where the embedding is equal to a mean (average) of the embeddings of the query terms found in the training data. In further features, the base embeddings may include a randomly initialized and trainable embedding representing an absent query for the plurality of recommendation instances, which is shared across the recommendation instances.

In further features, the HGCN includes two or more convolutional layers with different levels of connections between user profiles and content items.

In further features, the method may further include, for each search instance, determining the one or more query terms by comparing a query entered by the respective user to a database of frequent query terms.

In further features, the content item may be an image, audio, or video content.

In further features, there is provided a method of ranking content items. The method includes receiving, from a user computing device, a user profile and, optionally, a query input by the user; obtaining, from a database, a plurality of content items; processing, by the hypergraph convolutional network including at least one hyperedge and trained according to the method described above, the user profile, the query input and the plurality of content items to obtain a score for each of the plurality of content items, where each of the plurality of content items is ranked according to the score; and outputting the content items ranked according to the score to the user computing device for performing search and recommendation.

The technical advantage of the method is to provide a single model that provides recommendations to a user in addition to enabling the user to search.

In further features, the user profile may include a user identifier, one or more of a username, a location of the user and demographic information associated with the user.

In further features, there is provided one or more computer-readable storage media having stored thereon computer-executable instructions that, when executed by a processor, cause the processor to perform the methods described above.

In a feature, a computer-implemented method of training a hypergraph convolutional network (HGCN) to retrieve items includes: receiving training data including search instances and recommendation instances, each of the search instances including (a) a user profile, (b) a query comprising one or more query terms, and (c) an item, and each of the recommendation instances including (a) a user profile and (b) an item; constructing a hypergraph from the training data, where each node of the hypergraph represents one of a user profile, a query term, and a content item, and where the hypergraph represents each of the search instances and each of the recommendation instances as a hyperedge linking corresponding ones of the nodes; initializing base embeddings associated with the hypergraph nodes to constitute a base layer of the HGCN; propagating the base embeddings through one or more convolutional layers of the HGCN to obtain, for each of the convolutional layers, respective embeddings of the nodes of the hypergraph; computing, based on the base embeddings and the respective embeddings obtained from each of the one or more convolutional layers: a first loss determined based on a prediction by the HGCN of an item based on a corresponding user profile and query; and a second loss determined based on a prediction by the HGCN of a query based on a corresponding user profile and item; and selectively updating at least one of the base embeddings of the HGCN based on the first loss and the second loss.

In further features, the method further includes: aggregating the base embeddings and the embeddings obtained from each of the one or more convolutional layers using a convex combination of the embeddings, where computing the first loss and the second loss includes computing the first loss and the second loss based on the aggregation of the base embeddings and the embeddings obtained from each of the one or more convolutional layers.

In further features, computing the first loss includes computing the first loss based on a query embedding from a sum of the embeddings of query terms of the query.

In further features, computing the first loss includes computing the first loss using one of a Bayesian Personalized Ranking loss and a pointwise cross-entropy loss.

In further features, computing the second loss includes computing the second loss based on a sum of (a) a first loss associated with the prediction of the query based on the corresponding user profile and (b) a second loss associated with a prediction of the query based on the corresponding item.

In further features, the base embeddings include, for each of the recommendation instances, an all-zero vector, matrix, or value representing an absent query.

In further features: the base embeddings include, for each of the recommendation instances, an embedding representing non-inclusion of a query in the recommendation instances; and the embedding is equal to a mean of the embeddings of the query terms of the training data.

In further features, the base embeddings each include a randomly initialized and trainable embedding representing an absent query, which is shared across the recommendation instances.

In further features, the HGCN includes two or more convolutional layers with different levels of connections between user profiles and items.

In further features, the method further includes, for each of the search instances, determining one or more query terms by comparing a query to a database of query terms.

In further features, the item is one of an image, audio, and video.

In further features, initializing the base embeddings includes initializing base embeddings randomly.

In further features, each user profile includes a unique user identifier of a user and at least one of a username, a location of the user, and demographic information associated with the user.

In a feature, a method for ranking items: by one or more processors, receiving a hypergraph convolutional network (HGCN) trained according to the above; by one or more processors, receiving, from a computing device via a network, an input including one of (a) a user profile and (b) a user profile and a query; by the one or more processors, obtaining based on the input, from memory, a plurality of items; processing, by the trained HGCN, the items and the input including one of (a) the user profile and (b) the user profile and the query thereby determining scores for the items, respectively; by the one or more processors, ranking the items based on the scores, respectively; and by the one or more processors, transmitting the items ranked according to the score to the computing device.

In a feature, a method of ranking items includes: by one or more processors, receiving, from a computing device via a network, an input including one of (a) a user profile and (b) a user profile and a query; by the one or more processors, obtaining based on the input, from memory, a plurality of items; processing, by a trained hypergraph convolutional network (HGCN), the items and the input including one of (a) the user profile and (b) the user profile and the query thereby determining scores for the items, respectively; by the one or more processors, ranking the items based on the scores, respectively; and by the one or more processors, transmitting the items ranked according to the score to the computing device.

In further features, the user profile includes a unique user identifier of a user and at least one of a username, a location of the user, and demographic information associated with the user.

In further features, the input includes (b) the user profile and the query.

In further features, the HGCN includes a hypergraph, each node of the hypergraph representing one of a user profile, a query term, and an item; and the hypergraph representing each of a plurality of search instances and each of a plurality of recommendation instances as a hyperedge linking corresponding ones of the nodes.

In further features, the HGCN includes two or more convolutional layers with different levels of connections between user profiles and items.

In further features, the items each include one of an image, audio, and video.

In further features, the input includes (a) the user profile and does not include a query.

In further features, the HGCN is trained using training data including search instances and recommendation instances, where each of the search instances includes (a) a user profile, (b) a query comprising one or more query terms, and (c) an item, and where each of the recommendation instances includes (a) a user profile and (b) an item.

In further features, the HGCN is trained based on: a first loss determined based on a prediction by the HGCN of an item based on a corresponding user profile and query; and a second loss determined based on a prediction by the HGCN of a query based on a corresponding user profile and item.

In a feature, a training system includes: a training module configured to: receive training data including search instances and recommendation instances, each of the search instances including (a) a user profile, (b) a query comprising one or more query terms, and (c) an item, and each of the recommendation instances including (a) a user profile and (b) an item; a hypergraph convolutional neural network (HGCN) configured to: construct a hypergraph from the training data, where each node of the hypergraph represents one of a user profile, a query term, and a content item, and where the hypergraph represents each of the search instances and each of the recommendation instances as a hyperedge linking corresponding ones of the nodes, where the training module is further configured to initialize base embeddings of the HGCN; where the HGCN is configured to propagate the base embeddings through one or more convolutional layers of the HGCN to obtain, for each of the convolutional layers, respective embeddings of the nodes of the hypergraph; where the training module is further configured to: based on the base embeddings and the respective embeddings obtained from each of the one or more convolutional layers: a first loss determined based on a prediction by the HGCN of an item based on a corresponding user profile and query; a second loss determined based on a prediction by the HGCN of a query based on a corresponding user profile and item; and selectively update at least one of the base embeddings of the HGCN based on the first loss and the second loss.

In further features, there is provided an apparatus including processing circuitry, the processing circuitry being configured to perform the methods described above.

BRIEF DESCRIPTION OF THE DRAWINGS

The present disclosure will become more fully understood from the detailed description and the accompanying drawings, wherein.

The accompanying drawings are incorporated into and form a part of the specification for the purpose of explaining the principles of the embodiments. The drawings are not to be construed as limiting the embodiments to only the illustrated and described embodiments of how they can be made and used. Further features and advantages will become apparent from the following and more particularly from the description of the embodiments, as illustrated in the accompanying drawings, wherein.

DETAILED DESCRIPTION

Figure 1A:
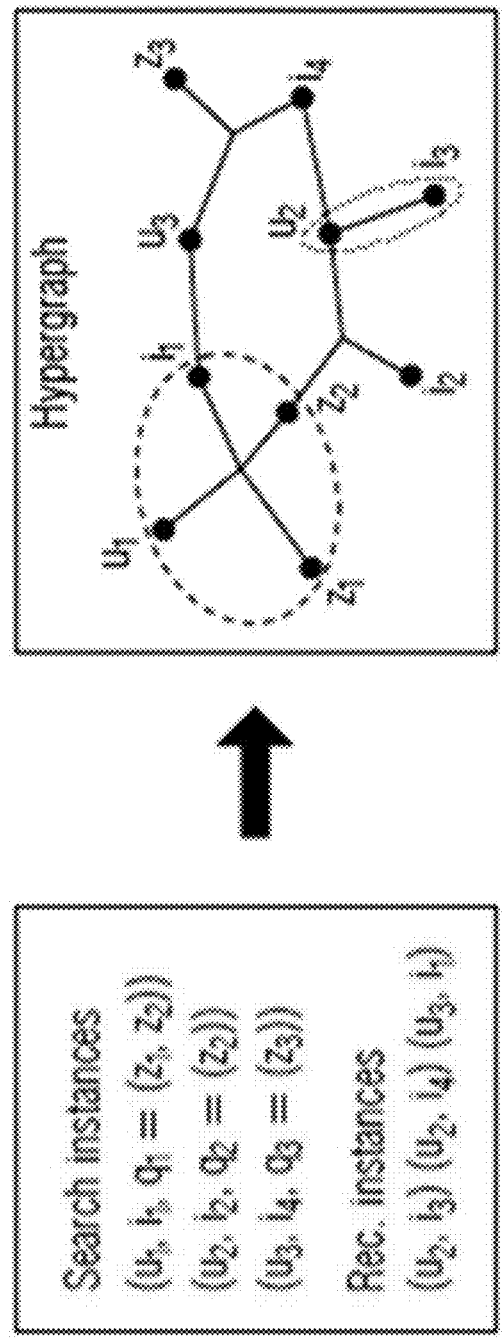
FIG. 1A illustrates an example of the formation of a hypergraph from search instances and recommendation instances.

Described herein are computing systems and computer-implemented methods for providing relevant (e.g., content) items to a user via a network. Specifically, a hypergraph convolutional neural network (HGCN) for search and recommendation (HyperSaR) is trained to rank content items in response to receiving search input from a user and also in response to receiving input indicative of a user request for a recommendation. The HyperSaR HGCN module described herein provides a single model that performs both search and recommendation tasks.

The training of the HyperSaR HGCN will first be described. The training data includes a plurality of search instances, $\mathcal{X}_S$, and a plurality of recommendation instances,$\mathcal{X}_R$. The set of training interactions may therefore be defined as $\mathcal{X} = \mathcal{X}_S \cup \mathcal{X}_R$. The training data is stored in memory, such as in a database. A computing device, for example a server, that executes and includes the HGCN is communicatively coupled to the memory to obtain the training data. The memory may be a component of the computing device or may be external to the computing device.

Defining a set of user profiles as $\mathcal{U}$, and a set of content items as $\mathcal{X}$, each search instance $x \in \mathcal{X}_S$ is a tuple composed of a user profile, $u_x \in \mathcal{U}$, a query $q_x$ formulated by the user corresponding to the user profile, and a content item $i_x \in \mathcal{J}$ which the user interacted on for this query. A recommendation instance $x \in \mathcal{X}_R$ is a pair made of a user profile $u_x \in \mathcal{U}$ and a content item $i_x \in \mathcal{J}$ which the user interacted on. The user profile includes suitable data that identifies the user, such as a unique identifier (e.g., string of numbers and/or characters). Each user profile may include a unique code, number or tag corresponding to the user-identification data. Such user-identification data may include information input by the user, such as a username when the user logs into the computing system. Data about the user such as location information, tastes and preferences, may be directly obtained from the user and/or indirectly obtained from monitoring user-clicked items on web pages, the user's IP address and so on. Additionally, demographic data, such as age, gender, location of residence, and other data may be directly obtained from the user when the user registers with the computing system. The content item may include at least one of an image, video content, audio content, and textual content. The content item may include a web page. Although the nature of interactions considered in this framework is not constrained, to determine the content item, implicit feedback (e.g., clicks on items, check-ins for points-of-interest, video views) is used, as implicit feedback may be a signal in a realistic setting. The problem of Joint Personalized Search and Recommendation (JPSR) includes training a model (or learning) from the search and recommendation instances in $\mathcal{X}$ which maps items to their relevance scores given a user and a (potentially empty) query.

Figure 1B:
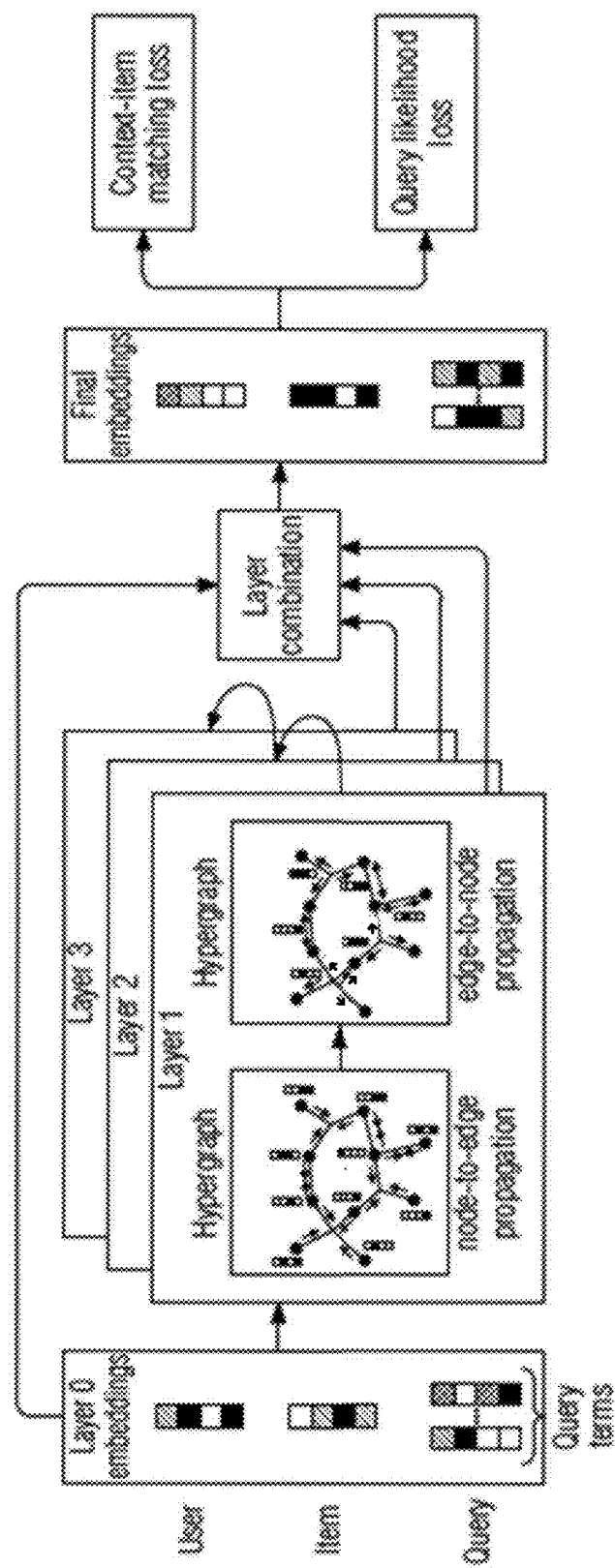
FIG. 1B is a block diagram illustrating the structure of the HyperSaR Hypergraph convolutional neural network.

FIGS. 1A-1B illustrates a hypergraph convolutional neural network (HGCN) for search and recommendation (HyperSaR) module. The HyperSaR HGCN module defines a hypergraph-based formulation of the problem to effectively integrate heterogeneous search and recommendation interactions in a unified framework.

FIG. 1A illustrates an example formation of a hypergraph. The nodes of the hypergraph are generated from the plurality of search instances,$\mathcal{X}_S$, and the plurality of recommendation instances, $\mathcal{X}_R$ of the training data. The hypergraph includes user nodes corresponding to the user profiles $u_x$, query terms, $z_x$, extracted from the queries $q_x$, and the content items $i_x$. The nodes are connected by hyperedges such that a search instance is represented as a hyperedge linking a user profile, a content item, and one or several query terms (indicated by the dashed line), and a recommendation instance is represented as a hyperedge between a user profile and a content item (indicated by the dotted line). The hypergraph is an undirected hypergraph.

In various implementations, the query terms, $z_x$, may include frequent query terms extracted from the queries $q_x$ by comparing a respective query to a database of frequent query terms. In this sense, the query terms correspond to keywords. For example, if the user were to input a Point-of-Interest (POI) domain query "cheap restaurant serving Sichuanese cuisine in the south of Paris", four query terms are identified: 'cheap', 'restaurant', 'Sichuanese cuisine', and 'south of Paris'. Query terms are therefore observed variables, obtained a priori from the queries.

Formally, let $\mathcal{H} = (\mathcal{V}, \varepsilon)$ denote the hypergraph with nodes $\mathcal{V}$ and hyperedges $\varepsilon$. The set $\mathcal{V}$ contains the user profile nodes $\mathcal{U}$, the content item nodes $\mathcal{J}$, and the query term nodes $\mathcal{Z}$. The hyperedges $\varepsilon$ include the search hyperedges $\varepsilon_S \subset \cup_{k=1}^{+\infty}(\mathcal{U} \times \mathcal{J} \times \mathcal{Z}^k)$ and the recommendation hyperedges $\varepsilon_R \subset \mathcal{U} \times \mathcal{J}$. The hyperedges $\varepsilon_S$ and $\varepsilon_R$ are respectively built from the search instances$\mathcal{X}_S$ and recommendation instances$\mathcal{X}_R$. Given a search instance $x=(u_x, i_x, q_x) \in \mathcal{X}_S$ and the query terms $(z_{x,1}, \ldots, z_{x,k}) \in \mathcal{Z}^k$ extracted from the query $q_x$, a degree-(k+2) hyperedge $e=\{u_x, i_x, z_{x,1}, \ldots z_{x,k}\} \in \varepsilon_S$ is created. Similarly, a recommendation instance $x=(u_x, i_x) \in \mathcal{X}_R$ yields a degree-2 hyperedge (in other words, an ordinary edge) $e=\{u_x, i_x\} \in \varepsilon_R$.

Similar to the characterization of a graph by an adjacency matrix, a hypergraph is uniquely identified by its incidence matrix. The incidence matrix H of the hypergraph $\mathcal{H}$ is a $|\mathcal{V}| \times |\varepsilon|$ binary matrix defined as follows:

$$H_{ij} = \begin{cases} 1 & \text{if } v_i \in e_j \\ 0 & \text{otherwise} \end{cases}$$

where $1 \leq i \leq |\mathcal{V}|$ and $1 \leq j \leq |\varepsilon|$ denote node indices and hyperedge indices, respectively. A row in matrix H indicates all the hyperedges a node is part of, and a column conversely gives all the nodes a hyperedge connects.

FIG. 1B illustrates the structure of an example implementation of the HyperSaR HGCN. The HyperSaR HGCN is configured to receive, as input, the hypergraph generated based on the plurality of search instances and the plurality of recommendation instances. Each node i of the hypergraph is first associated with a respective base embedding $E_{V,i}^{(0)}$ (each node's 'layer-0' embedding). The base embeddings may be randomly-initialized vectors that constitute the base layer of the HyperSaR HGCN. As will be described in more detail below, the base embeddings may be learned by backpropagation.

The first convolutional layer of one or more convolutional layers of the HyperSaR HGCN is configured to receive as input the base embeddings. The first convolutional layer is configured to compute a first embedding of the nodes of the hypergraph, which is output to the second convolutional layer.

The second convolutional layer of the HyperSaR HGCN is configured to compute, using the embedding received from the first convolutional layer, a second embedding. Each convolutional layer, i, is therefore configured to receive an embedding from a previous layer, i−1, and to generate a respective embedding of the nodes of the hypergraph based on the received embedding, and to output the generated embedding to the subsequent convolutional layer, i+1. Accordingly, the base embeddings are propagated through the one of more convolutional layers of the HyperSaR HGCN. The embeddings respectively output by each of the one or more convolutional layers are combined with the base embeddings (layer combination) by aggregation to generate final embeddings of the nodes of the hypergraph. While the example of three convolutional layers is illustrated, the HyperSaR HGCN may include another suitable number of layers. In various implementations, the HyperSaR HGCN includes one convolutional layer. In various implementations, the HyperSaR HGCN includes a plurality of convolutional layers, such as two or three convolutional layers. The convolutional layers may set out different levels of connections between items (i.e., content items) and users (i.e., user profiles).

The hypergraph convolution operation can be decomposed in two portions or steps: (i) the node embeddings are propagated to the hyperedges they belong to and aggregated there as hyperedge embeddings, and (ii) the hyperedge embeddings are propagated back to the nodes and combined to form the new node embeddings. Denoting as $E_{V,i}^{(k)}$ and $E_{\varepsilon,j}^{(k)}$ the layer-k embeddings of a node i and an hyperedge j, respectively, the hypergraph convolution operation may be described by:

$$E_{\varepsilon,j}^{(k)} = AGG_{\varepsilon} E_{V,i}^{(k-1)} \quad :i \in \mathcal{N}_j^{\mathcal{E}} \}) \tag{1a}$$

$$E_{V,i}^{(k)} = AGG_V(\{E_{\varepsilon,j}^{(k)} : j \in \mathcal{N}_i^{\mathcal{V}} \}) \tag{1b}$$

where $\mathcal{N}_j^{\mathcal{E}}$ (resp. $\mathcal{N}_i^{\mathcal{V}}$) denotes the set of nodes connected by hyperedge j (resp. the set of hyperedges node i is part of), i.e., the neighborhood of hyperedge j (resp., node i) in the hypergraph. The aggregation operators $AGG_{\varepsilon}$ and $AGG_V$ may take the form of a weighted sum and may optionally be followed by a fully connected layer. Various implementations may use a weighted sum for $AGG_{\varepsilon}$ and the combination of a weighted sum and a fully-connected layer for $AGG_V$. Various implementations define both aggregation operators using fully-connected layers, such as to enable hyperedge embeddings to have a nonlinear dependency with node embeddings. In a preferred embodiment, both aggregation operators are a weighted sum. Adopting the sum operator, along with standard normalization based on node and hyperedge degrees, the HyperSaR HGCN can be described as follows:

$$E_{\varepsilon,j}^{(k)} = \frac{1}{\sqrt{|\mathcal{N}_j^{\varepsilon}|}} \sum_{i \in \mathcal{N}_j^{\varepsilon}} \frac{1}{\sqrt{|\mathcal{N}_i^{\mathcal{V}}|}} E_{V,i}^{(k-1)} \tag{2a}$$

$$E_{V,i}^{(k)} = \frac{1}{\sqrt{|\mathcal{N}_i^{\mathcal{V}}|}} \sum_{j \in \mathcal{N}_i^{\mathcal{V}}} \frac{1}{\sqrt{|\mathcal{N}_j^{\varepsilon}|}} E_{\varepsilon,j}^{(k)} \tag{2b}$$

where $|\mathcal{N}_j^{\mathcal{E}}|$ is the number of nodes connected by hyperedge j and $|\mathcal{N}_i^{\mathcal{V}}|$ is the number of hyperedges node i is part of. Denoting the hyperedge degree matrix as $D_{\varepsilon} = \text{diag}(|\mathcal{N}_j^{\mathcal{E}}| : j \in \varepsilon) \in \mathbb{R}^{|\varepsilon| \times |\varepsilon|}$ and the node degree matrix as $D_V = \text{diag}(|\mathcal{N}_i^{\mathcal{V}}| : i \in \mathcal{V}) \in \mathbb{R}^{|\mathcal{V}| \times |\mathcal{V}|}$, the matrix form of the HyperSaR HGCN can be written as:

$$E_{\varepsilon}^{(k)} = (D_{\varepsilon}^{-1/2} H^T D_V^{-1/2}) E_V^{(k-1)} \tag{3a}$$

$$E_V^{(k)} = (D_V^{-1/2} H D_{\varepsilon}^{-1/2}) E_{\varepsilon}^{(k)} \tag{3b}$$

where H is the incidence matrix of the hypergraph. After L layers of propagation in the hypergraph, the node embeddings of each layer $\{E_V^{(0)}, E_V^{(1)}, \ldots, E_V^{(L)}\}$ are obtained by the HyperSaR HGCN. Each $E_V^{(k)}$ can be decomposed as $(E_{\mathcal{U}}^{(k)}, E_{\mathcal{I}}^{(k)}, E_{\mathcal{Z}}^{(k)})$ which correspond respectively to the user profile embeddings, content item embeddings and query term embeddings at layer k. The embeddings at different layers may be aggregated using, for example, a convex combination:

$$E_{\mathcal{U}} = \Sigma_{k=0}^L \alpha_k^{\mathcal{U}} E_{\mathcal{U}}^{(k)}, E_{\mathcal{I}} = \Sigma_{k=0}^L \alpha_k^{\mathcal{I}} E_{\mathcal{I}}^{(k)},$$
$$E_{\mathcal{Z}} = \Sigma_{k=0}^L \alpha_k^{\mathcal{Z}} E_{\mathcal{Z}}^{(k)} \tag{4}$$

where the layer weights $\alpha_k^{\mathcal{U}}, \alpha_k^{\mathcal{I}}$ and $\alpha_k^{\mathcal{Z}}$ are hyperparameters such that $\Sigma_{k=0} \alpha_k^{\mathcal{U}} = \Sigma_{k=0} \alpha_k^{\mathcal{I}} = \Sigma_{k=0} \alpha_k^{\mathcal{Z}} = 1$. Setting of the layer weights is further discussed below.

The HyperSaR HGCN is configured to compute two loss functions based on the final embeddings: a first loss based on a prediction of a content item given a corresponding user profile and a second loss based on a prediction of a query given a corresponding user profile and content item. A training loss used to update the base embeddings is a combination (function) of the first loss (referred to herein as the context-item matching loss) and the second loss (referred to herein as the query likelihood loss).

More specifically, given the final user profile embeddings $E_{\mathcal{U}}$, content item embeddings $E_{\mathcal{I}}$, and query term embeddings $E_{\mathcal{Z}}$ obtained from the propagation in the hypergraph, the loss used to train the HyperSaR model's parameters—which solely consist of the layer-0 embeddings $E_V^{(0)}$—can be defined.

For a given interaction, the context-item matching loss may enforce that the embeddings of the user profile and query terms (in the case of search interactions) are close to the embedding of the content item with which the user interacted. The user profile and the query are designated here as the context. To match the context and the item embeddings, a dot product is used because of its demonstrated effectiveness in comparison to more complex scoring operations, and efficiency at inference time.

Before detailing the computation of the context-item matching score, the query embedding will be first discussed. The interactions on which the model is trained include both search and recommendation interactions. Because of this heterogeneity in the data, the two cases are tackled separately:

Let $x = (u_x, i_x, q_x) \in \mathcal{X}_S$ be a search interaction. As detailed above, query terms $(z_{x,1}, \ldots, z_{x,k})$ are extracted from queries $q_x$. The embedding of $q_x$ may be defined as the sum of its respective query term embeddings:

$$E_{Z,q_x} = \sum_{i=1}^{k} E_{Z,z_{x,i}}$$

A sum may be adopted instead of a mean to use the number of query terms as a confidence factor in the loss. An instance with a greater number of query terms will lead to a sigmoid in a context-item matching loss $L_{CIM}$ (defined below) that is closer to 0 or 1 and thus yield a larger contribution in the loss.

Let $x=(u_x, i_x) \in \mathcal{X}_R$ be a recommendation interaction. In this case, no query is available, i.e., $q_x=\emptyset$. In various implementations, $E_{Z,q_x}$ is set as an all-zero vector $E_{Z,\emptyset} =0$. In various implementations, the query term set $Z$ is augmented with an artificial zero-query entry and learn the additional embedding corresponding to it. In another embodiment, $E_{Z,q_x}$ is defined as the mean query term embedding in $E_Z$.

Based on the definition of the query embedding, $E_{Z,\emptyset}=0$, the context-item matching score for an interaction x including a user profile $u_x$, a content item $i_x$, and a query $q_x$ (potentially equal to $\emptyset$) is computed by the HyperSaR HGCN as the sum of dot products between pairs of embeddings, such as using the equation:

$$\hat{y}_{u_x,i_x,q_x} E_{U,u_x} E_{J,i_x} E_{U,u_x} E_{Z,q_x} E_{J,i_x} E_{Z,q_x} \quad (5)$$

This score may be included in a Bayesian Personalized Ranking (BPR) loss, which is a pairwise ranking loss. As an example, the BPR loss may be as described in Rendle, S. et al., BPR: Bayesian personalized Ranking from Implicit Feedback, UAI, 452-461, 2009, which is incorporated herein in its entirety. The context-item matching loss can be described by:

$$\mathcal{L}_{CIM} = -\frac{1}{|x|} \sum_{x \in X} \sum_{i_n \in \mathcal{J} \setminus \{i_x\}} \log \sigma(\hat{y}_{u_x,i_x,q_x} - \hat{y}_{u_x,i_n,q_x}) + \lambda \|E_V^{(0)}\|_F^2 \quad (6)$$

where $i_n \in \mathcal{J} \setminus \{i_x\}$ denotes a negative sample item, $\sigma$ is the sigmoid function, $\lambda$ balances the strength of the $L_2$ regularization on the model parameters $E_V^{(0)}$, and $\|\cdot\|_F$ indicates the Frobenius norm.

The context-item matching loss is combined with an additional loss defined on the search instances, which may make the embeddings more suitable for the retrieval task. For that purpose, a query likelihood loss may be used, which measures the extent to which a user and an item are individually likely to produce the query terms. First, the user-specific and item-specific probability distributions over query terms are defined using a softmax formulation as follows:

$$p(z|u) = \frac{\exp(E_{U,u}^T E_{Z,z})}{\sum_{z' \in Z} \exp(E_{U,u}^T E_{Z,z'})} \quad (7a)$$

$$p(z|i) = \frac{\exp(E_{J,i}^T E_{Z,z})}{\sum_{z' \in Z} \exp(E_{J,i}^T E_{Z,z'})} \quad (7b)$$

The probability p(z|u) is large when user u and query term z are close in the embedding space, and similarly applies to p(z|i). This co-activation behavior between users/items and query terms is consistent with the context-item matching score defined in Equation 5, which thus leads both objectives to mutually benefit each other. The query likelihood loss is then obtained from the sum of the likelihood according to $p(z|u_x)$ and the likelihood according to $p(z|i_x)$ for all search interactions $x \in \mathcal{X}_S$:

$$L_{QL} = -\frac{1}{|X_S|} \sum_{x \in X_S} \frac{1}{|q_x|} \sum_{z \in q_x} \log p(z|u_x) - \frac{1}{|X_S|} \sum_{x \in X_S} \frac{1}{|q_x|} \sum_{z \in q_x} \log p(z|i_x) \quad (8)$$

Note that the loss is computed separately from $p(z|u_x)$ and $p(z|i_x)$, instead of using a single (user, item)-specific distribution $p(z|u_x, i_x)$. This may avoid conflating the contribution of the user and that of the item to the query reconstruction, which may be detrimental to performance in practice. Thus, the query likelihood loss described herein pushes both the user and item embeddings to be close to the embeddings of the terms in the query. Additionally, unlike other techniques that rely on pre-trained word embeddings, the query term embeddings described herein are jointly learned with user and item embeddings. Being independent from pre-trained word embeddings makes the approach described herein be more adaptable and robust to different domains and languages.

The two losses are linearly combined using a balancing hyperparameter $\eta$ as $L=L_{CIM}+\eta L_{QL}$. The model parameters—the layer-0 embeddings $E_V^{(0)}$—are then learned by minimizing L using stochastic gradient descent.

Figure 2:
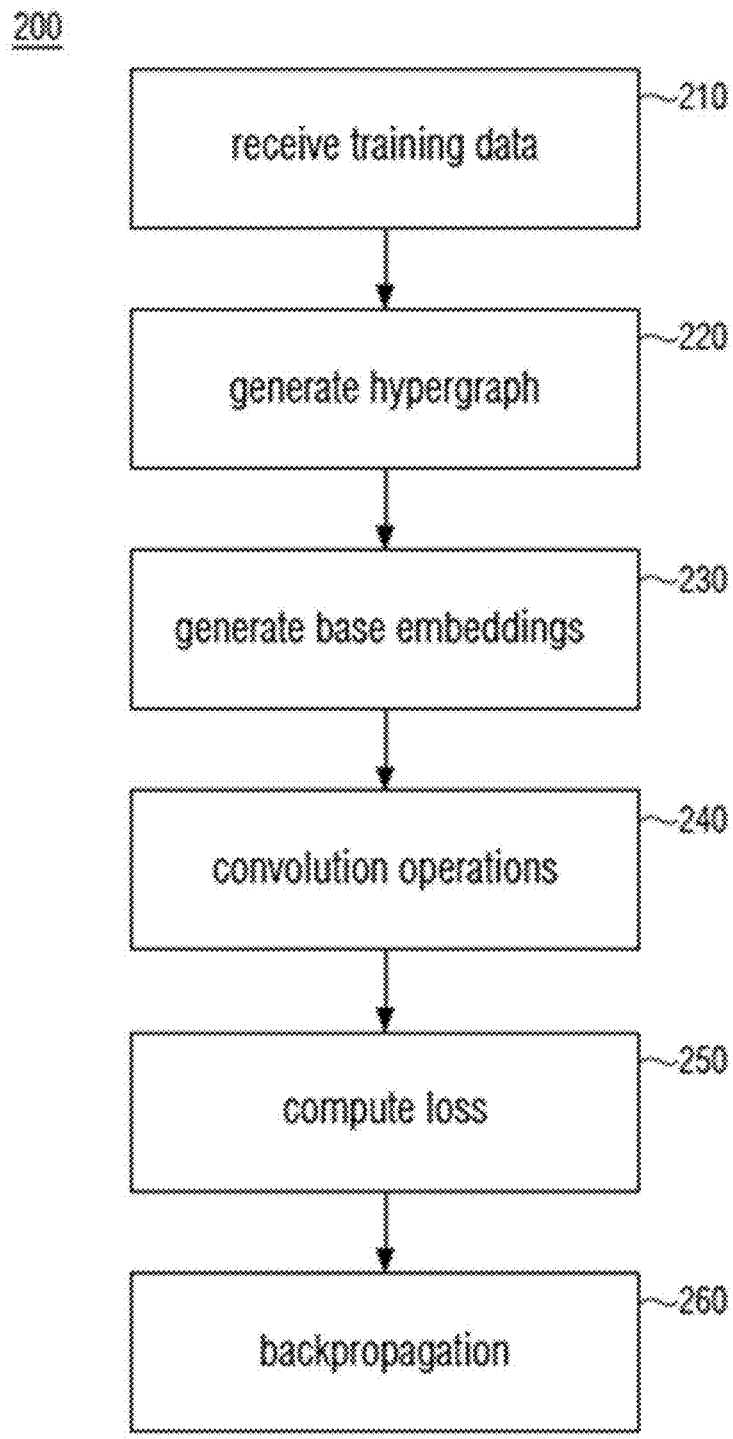
FIG. 2 is a flow diagram illustrating a method of training the HyperSaR hypergraph convolutional neural network.

FIG. 2 is a flow diagram illustrating a method 200 of training the HyperSaR HGCN described above with reference to FIGS. 1A and 1B. The method is performed by a computing device or computing system including a training module 600, such discussed in conjunction with FIG. 5 below.

At 210, training data is received by the training module 600. The training module 600 may obtain the training data in any suitable manner from memory, such as from a database that stores the training data. As described above, the training data includes a plurality of search instances and a plurality of recommendation instances. Each search instance includes a user profile, a query including one or more query terms, and a content item. Each of the plurality of recommendation instances includes a user profile and a content item. Each of the plurality of recommendation instances does not include a query. Recommendation requests may be generated by a computing device, for example, automatically in response to turning on of the computing device.

At 220, a hypergraph is generated by the training module 600 based on the training data. Each node of the hypergraph represents a user profile, a query term, or a content item. The nodes of the hypergraph are connected by hyperedges. The hypergraph represents each of the plurality of search instances and each of the plurality of recommendation instances as a respective hyperedge linking corresponding nodes.

At 230, the hypergraph representation of the training data is input into the trained HyperSaR HGCN. The HyperSaR HGCN generates base embeddings of the hypergraph by randomly initializing d-dimensional vectors representing the nodes of the hypergraph. The randomly-initialized base embeddings associated with the nodes constitute a base layer of the HyperSaR HGCN.

At 240, the base layer is propagated through one or more convolutional layers of the HyperSaR HGCN. As described above, each convolutional layer receives an embedding of the hypergraph from a preceding convolutional layer and, based on the received embedding, generates a new embedding for a next convolutional layer. The embeddings of each of the one or more convolutional layers and the base layer are aggregated to form the final embeddings.

At 250, the HyperSaR HGCN determines a first loss based on (a) a prediction of a content item given a user profile and a corresponding query and (b) a stored (known) content item associated with the user profile and the query. The HyperSaR HGCN determines a second loss based on (a) a prediction of a query given a user profile and a corresponding content item and (b) a stored (known) query associated the user profile and the content item.

The HyperSaR HGCN determines the training loss based on both the first loss and the second loss. At 260 the training module trains the HyperSaR HGCN by updating the base embeddings based on the training loss, such as using backpropagation. For example, the training module may adjust one or more values or components of the base embeddings based on the training loss. The training module may train the HyperSaR HGCN for a predetermined number of samples or a predetermined number of groups of samples, each group including a predetermined number of samples.

Once trained, the HyperSaR HGCN is configured to receive a search input from a computing device and to output at least one content item corresponding to the search input to the computing device from which the search input was received. Communication of the search input and the response to the search input is performed over a network. The search input includes a user profile and a query. The HyperSaR HGCN is additionally configured to receive a recommendation input from a computing device and to output at least one content item corresponding to the recommendation input to the computing device from which the recommendation input was received. The recommendation input includes (e.g., only) the user profile and does not include a query. As discussed above, a computing device may generate and output a recommendation input, for example, in response to turning on of the computing device and/or in one or more other situations.

At inference time, an interaction x includes either a user-query pair ($u_x$, $q_x$) (in the example of the search task) or a user $u_x$ and an empty query $q_x = \emptyset$ or no query (in the example of the recommendation task). The trained HyperSaR HGCN is configured to generate an item ranking, such as that maximizes utility with respect to the user's information needs. To that end, the HyperSaR HGCN scores all possible content items $i \in \mathcal{I}$, such as based on or using Equation 5. In this regard, the HyperSaR HGCN generates a set of context-item matching scores $\{\hat{y}_{u_x, i, q_x}\}_{i \in \mathcal{I}}$, which are sorted in descending order to form the final item ranking returned to the user.

Figure 3:
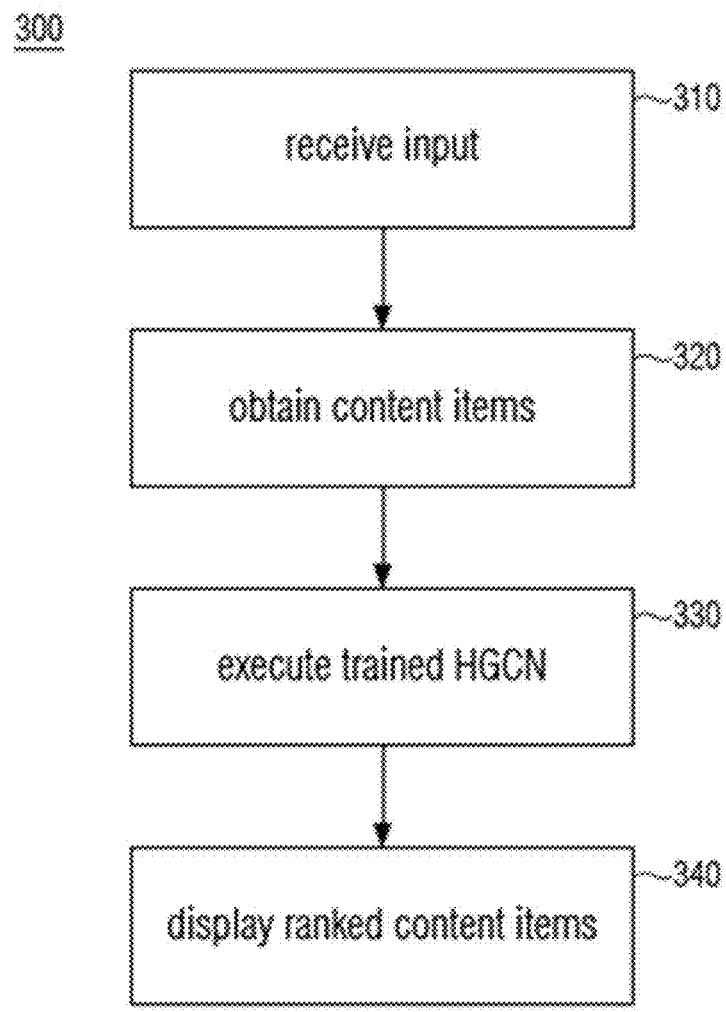
FIG. 3 is a flow diagram illustrating a method of ranking content items using the HyperSaR hypergraph convolutional neural network.

FIG. 3 is a flow diagram illustrating a method 300 of ranking content items using the HyperSaR HGCN as described in FIGS. 1A and 1B and trained in accordance with the method described in conjunction with FIG. 2.

At 310, a computing device that executes the HyperSaR HGCN receives a search input or a recommendation input. Receiving the search input may include a user inputting a search query into the computing device or into a computing device (for example, a computer, tablet, smartphone, or other type of computing device) communicatively (via a network) coupled to the computing device that executes the HyperSaR HGCN. Receiving the recommendation input may include a user identifying themselves (e.g., logging in via username/password) to the computing device or to a computing device communicatively (via a network) coupled to the computing device that executes the HyperSaR HGCN.

At 320, the computing device that executes the HyperSaR HGCN obtains a plurality of content items (e.g., all possible content items). The plurality of content items are stored in memory, such as in a database. The computing device may access the memory to retrieve the content items.

At 330, the computing device that executes the trained HyperSaR HGCN inputs the information received from the computing device of the user (the user profile and the optional query) and the plurality of content items. The trained HyperSaR HGCN outputs a score for each of the plurality of content items. The score for each content item is proportional to (or corresponds to) a probability that the respective content item corresponds to the user profile (in the recommendation example) or to the user profile and the query (in the search example).

The computing device that executes the HyperSaR HGCN ranks the plurality of content items according to the score and, at 340, transmits the ranks (e.g., in the form of a list ranked from highest to lowest score) to the computing device of the user for output. At 340, the computing device of the user outputs the content items ranked according to the score, such as by displaying the content items on a display (e.g., in a user interface) and/or audibly by outputting the content items via one or more speakers.

Experiments, such as those described hereafter, have shown that the HyperSaR HGCN approach described herein significantly outperforms other models on the JPSR task.

The experiments were performed on two datasets: a real-world, industrial dataset based on the South-Korean search engine Naver (https://www.naver.com) and the public MovieLens dataset (https://grouplens.org/datasets/movielens).

The Naver dataset is based on a portion of the Naver search engine's logs collected between 01/09/2020 and 07/09/2020. The items in this dataset correspond to Points-of-Interest (POIs) located in South Korea. Interactions include of clicks on items; this dataset is thus based on implicit feedback signals. The logs include two types of interactions: search interactions (including a user, a clicked item, and a query) and recommendation interactions (including only a user and a clicked item, without query information). Queries are in Korean language, and were pre-processed using the Okt tokenizer from KoNLPy (available at https://konlpy.org/en/latest). Duplicates corresponding to repeated (user, item, query) search tuples or (user, item) recommendation tuples were first removed. Then a core-20 filtering was applied to the dataset to discard users and items with less than 20 interactions in total (counting both search and recommendation interactions).

The MovieLens dataset may be used for the recommendation task. Its items correspond to movies and include two types of interactions: rating interactions, which correspond to a user assigning a rating (between 0 and 5) to a movie, and tagging interactions, in which a user associates a movie with a tag (in English language) including one or more words. As there exists no public dataset for the JPSR task, the MovieLens dataset may be used as a proxy. Rating interactions may be considered as recommendation interactions, and tagging interactions as search interactions by assimilating tags and queries. Both tags and queries reflect to some extent the user's perception of an item (or user intent) which justifies the relevance of this dataset to validate the HyperSaR HGCN.

The MovieLens-25M version (https://grouplens.org/datasets/movielens/25m/) may be used. Given that the JPSR task relates to a scenario with mixed search and recommendation interactions, the data may be filtered to retain users with at least one tagging interaction. Rating interactions may be binarized to emulate an implicit feedback scenario, and ratings between 0 and 2.5 may be considered as signals of irrelevance (with 2.6-5.0 being signals of relevance). A core-10 filtering technique may be applied to keep users and items with at least 10 interactions of any nature (either rating or tagging).

The statistics of those two datasets after pre-processing are summarized in Table 1. For both datasets, a temporal split was followed by considering the first 80% interactions of each user as the training set and the remaining interactions as the test set. The last 25% interactions of the training set (i.e., 20% of the total interactions) may be used as validation set to select hyperparameters (see below).

TABLE 1

| Dataset | #users | #items | #search interactions | | #recommendation interactions | |
|---|---|---|---|---|---|---|
| | | | train | test | train | test |
| Naver | 22,110 | 20,376 | 221,088 | 52,132 | 413,415 | 95,411 |
| MovieLens | 11,807 | 17,880 | 629,189 | 181,170 | 1,387,406 | 317,17 |

The HyperSaR HGCN model is compared below against other models. Unless specified otherwise, models are trained with a BPR loss (as described in Rendle S. et al., BPR: Bayesian Personalized Ranking from Implicit feedback, UAI, 452-461, 2009). Recommendations, which do not include query information, were first considered to show that such approaches are insufficient for the JPSR task. For these approaches, the search instances are simply considered as (user, item) pairs by ignoring queries. Thus, the recommendation approaches are trained on the same amount of interactions as the methods that exploit the queries. The Matrix Factorization (MF) model is described in Koren Y. et al., Matrix Factorization Techniques for Recommender Systems, Computer 42, 8 (2009), 30-37). The LightGCN model is described in He X. et al., LightGCN: Simplifying and Powering Graph Convolution Network for Recommendation, SIGIR, 639-648, 2020. Models that include queries in their modeling are also compared. The Factorization Machine (FM) is described in Rendle, S. Factorization machines, ICDM, 995-1000, 2010. The DeepFM model is described in Guo H. et al., DeepFM: A Factorization-Machine based neural network for CTR Prediction, IJCAI, 1725-1731, 2017. The JSR model is described in Zamani H. et al., Learning a Joint Search and Recommendation Model from User-Item Interactions, WSDM, 717-725, 2020. The BM25 model is described in Sparck Jones K. et al., A Probabilistic Model of Information retrieval: Development and Comparative Experiments—Part 2, Information Processing and Management 36, 6, (2000), 809-840.

Evaluation was performed on a per-interaction basis. At test time a model will predict a ranking of items for each interaction. Based on a ground truth including the single interacted item, the ranking is evaluated in terms of Hit Rate at cutoff 1, 10, and 20 (denoted as HR@1, HR@10, and HR@20, respectively). Because there is only one ground truth item, the Hit Rate may be considered to be equivalent to the Recall metric. This evaluation protocol was chosen instead of the per-user evaluation as, in the JPSR scenario, users interact with items based on the context (here, the potential query). An item is therefore not considered as relevant for a user in an absolute manner, but only relatively to the context of the interaction.

Each models' performance is reported separately on the search interactions and recommendation interactions of each dataset. The performance across search and recommendation interactions can vary a lot, so combining the results on both types of interactions would thus obfuscate the individual performance on search and recommendation. Therefore, the results presented in the experiments correspond to the average performance over all search instances and the average over all recommendation instances.

Regarding hyperparameters, an Adam optimizer may be used and the embedding size set to 64, the batch size to 1024, the learning rate to 0.001, and the number of negative samples to 1. Negative items may be sampled uniformly from the whole set of items $\mathcal{J}$. A L2 regularization weight may be fixed to 0 as only a limited impact on performance may occur. For the models which involve queries (FM, DeepFM, JSR, BM25, and HyperSaR HGCN), the number of query terms may be set to 2000 and the query terms which (i) have the highest frequencies in queries and (ii) occur in less than 10% of all the queries (to eliminate stop words) may be selected. The impact of the number of query terms on performance is discussed below.

Layer weights (e.g., see equation 4) $\alpha^{\mathcal{U}}$ and $\alpha^{\mathcal{J}}$ may be set to uniform value, i.e., 1/(L+1). As to $\alpha^{\mathcal{Z}}$, allocating more mass to earlier layers may be more beneficial in practice and thus was set $\alpha_0^{\mathcal{Z}} = 1$ and $\alpha_k^{\mathcal{Z}} = 0$ for k>0.

The hyperparameters of the following were selected on the validation set: edge dropout rate, Rong Y. et al., DropEdge: Towards deep Graph Convolutional Networks on Node Classification, ICLR, 2020 (for LightGCN, HyperSaR); weight dropout rate Srivastava N et al., Dropout: A Simple Way to Prevent Neural networks from Overfitting", Journal of Machine Learning Research 15, 1 (2014), 1929-1958) (for JSR, DeepFM); number of layers (for LightGCN, DeepFM, JSR, HyperSaR); and loss balancing weight η (for JSR, HyperSaR).

To avoid a computationally costly grid search, η=0 may be first kept for JSR and HyperSaR HGCN while searching for the dropout rate and number of layers, and then n may be optimized using the optimal dropout rate and number of layers. The range for the dropout rate, number of layers, and weight η may be defined as {0.0, 0.1, 0.2, 0.3}, {0, 1, 2, 3}, and {0.0, 0.001, 0.01}, respectively.

For the hyperparameter selection, the HR@20 score may be used on the validation set. Taken into account may be the performance on both the search instances and recommendation instances, which can vary greatly across these two sets. The search performance may be greater than the recommendation performance, due to the additional query signal. Using the overall HR@20 on both interaction types may hide smaller improvements on recommendation instances. The HR@20 scores may therefore be first normalized separately on search and recommendation instances, by dividing by the maximum performance on each interaction type obtained across the hyperparameter range. Then the two normalized scores may be summed, and the result may be used as a criterion for the selection.

The results on recommendation instances of the Naver and MovieLens datasets are presented in Table 2. 5 runs per approach were performed on each dataset with different seeds and the average performance reported in terms of HR@{1, 10, 20}, along with the standard error around the mean. To detect differences between the HyperSaR model and baselines, a statistical significance testing analysis was conducted based on an unpaired Student t-test with a significance level at 0.01. Table 2 highlights the best (resp. second-best) result for each (dataset, metric) pair using boldface (resp. underline) and indicates statistically significant improvements with t. The improvement percentage and p-value between best and second-best approaches are also shown.

TABLE 2

| | Naver | | | MovieLens | | |
|---|---|---|---|---|---|---|
| Model | HR@1 | HR@10 | HR@20 | HR@1 | HR@10 | HR@20 |
| MF | 0.0061 ± 0.0000 | 0.0493 ± 0.0002 | 0.0872 ± 0.0002 | 0.0031 ± 0.0000 | 0.0266 ± 0.0001 | 0.0487 ± 0.0001 |
| LightGCN | 0.0067 ± 0.0001 | 0.0524 ± 0.0001 | 0.0924 ± 0.0001 | 0.0040 ± 0.0000 | 0.0318 ± 0.0001 | 0.0566 ± 0.0001 |
| FM | 0.0067 ± 0.0001 | 0.0535 ± 0.0002 | 0.0946 ± 0.0003 | 0.0033 ± 0.0000 | 0.0278 ± 0.0001 | 0.0508 ± 0.0001 |
| DeepFM | 0.0066 ± 0.0001 | 0.0528 ± 0.0004 | 0.0935 ± 0.0004 | 0.0035 ± 0.0000 | 0.0290 ± 0.0001 | 0.0526 ± 0.0003 |
| JSR | 0 0063 ± 0.0001 | 0.0510 ± 0.0001 | 0.0905 ± 0.0002 | 0.0042 ± 0.0001 | 0.0317 ± 0.0002 | 0.0560 ± 0.0001 |
| HyperSar | 0.0073 ± 0.0001† | 0.0574 ± 0.0002† | 0.1004 ± 0.0002† | 0.0044 ± 0.0000† | 0.0334 ± 0.0001† | 0.0590 ± 0.0001† |
| Improv./p | 8.96%/6.17e−3 | 7.29%/1.97e−5 | 6.13%/6.23e−7 | 4.76%/7.95e−3 | 5.03%/2.66e−5 | 4.24%/8.05e−7 |

The HyperSaR HGCN significantly outperforms all other models on every (dataset, metric) pair, including the recommendation approach LightGCN. The improvements over the second-best approach range from 6.13% to 8.96% on Naver and from 4.24% to 5.03% on the MovieLens dataset. At test time on recommendation instances, all approaches use the same information including (user, item) pairs. This means that the improvements obtained by the HyperSaR HGCN over LightGCN are due to HyperSaR's joint search and recommendation training, which enabled the model to learn more accurate user and item representations. Thus, performance on the recommendation task can benefit from search data and its query signal.

Comparing across other approaches, some differences are noted based on the dataset. On the Naver dataset, FM was the second-best approach, followed by DeepFM and Light-GCN. On the MovieLens dataset, LightGCN and JSR performed similarly and obtained the second-best results.

The same procedure as described above for the recommendation task was followed for the search task. The results for the search task are shown in Table 3. The approaches which involve query information (FM, DeepFM, JSR, BM25, HyperSaR) outperformed the purely collaborative filtering approaches (MF, LightGCN) on both datasets. Access to the test-set interaction query provides an advantage to identify the relevant item.

ancing weight which controls the weight of the query likelihood loss over the context-item matching loss.

Figure 4A:
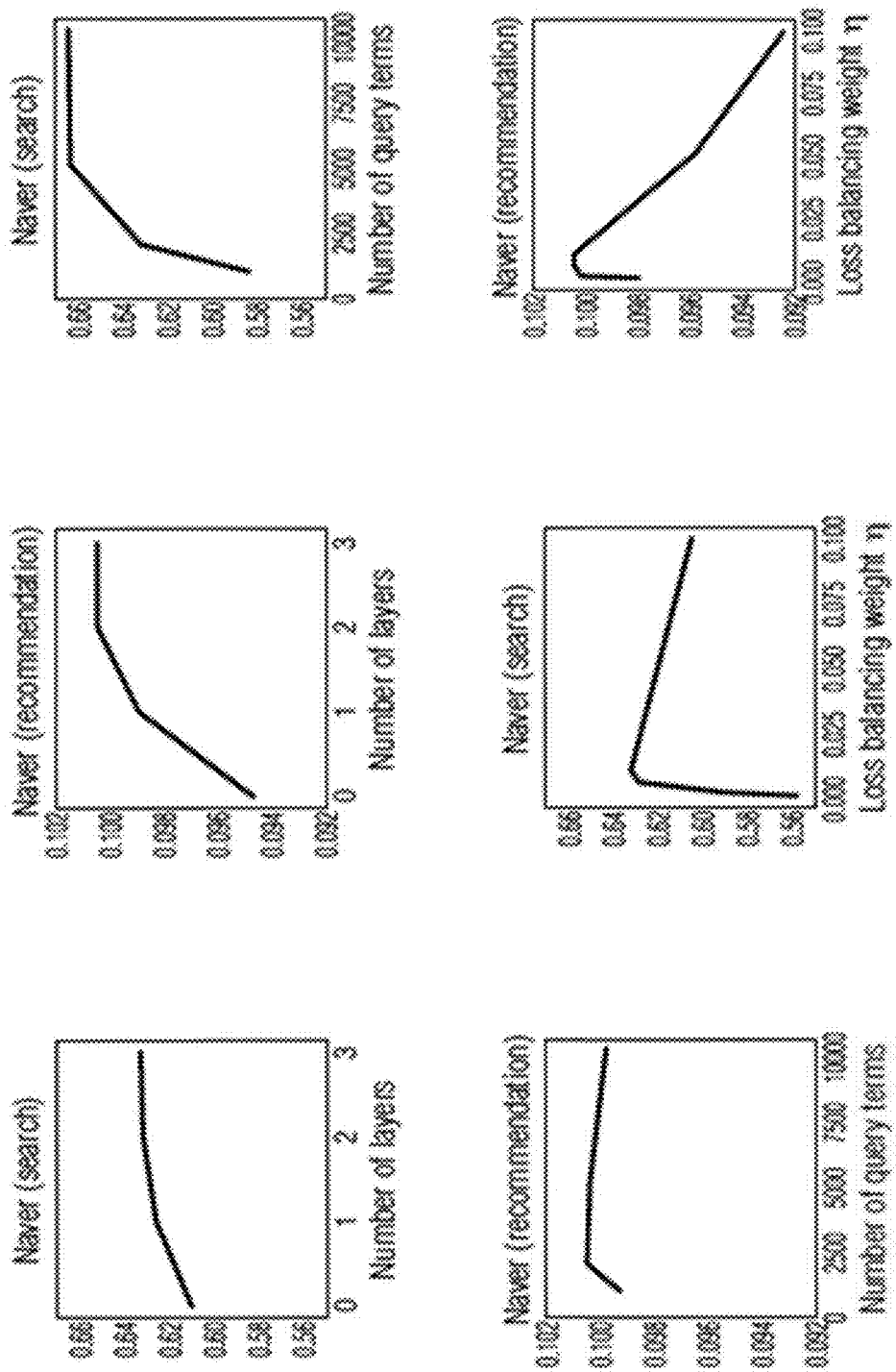
FIG. 4A illustrates experiment results applying the HyperSaR hypergraph convolutional neural network to a Naver dataset.
Figure 4B:
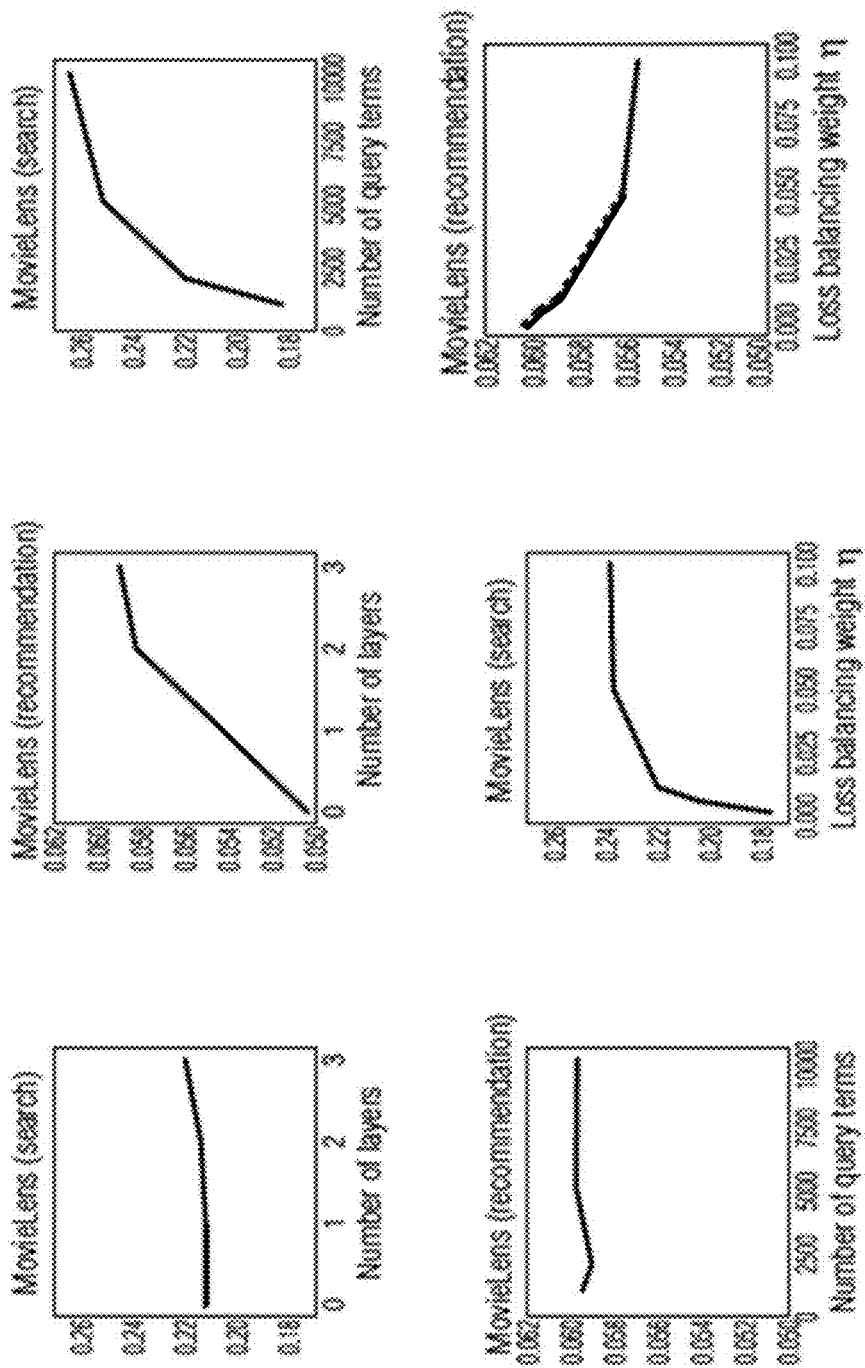
FIG. 4B illustrates experiment results applying the HyperSaR hypergraph convolutional neural network to the MovieLens dataset.

These hyperparameters may be the most impactful hyperparameters on the performance results. FIGS. 4A and 4B summarize the results for the HyperSaR HGCN with varied hyperparameters on the Naver and the MovieLens test datasets. Each plot shows the performance of the HyperSaR HGCN in terms of HR@20 as a function of a given hyperparameter's value, based on one run. The decision to rely on a single run may be justified by the low variance observed for the HyperSaR HGCN in Tables 2 and 3. The tested values for the number of layers, the query term vocabulary size, and the loss balancing weight $\eta$ respectively correspond to $\{0, 1, 2, 3\}$, $\{1000, 2000, 5000, 10000\}$, and $\{0.0, 0.001, 0.005, 0.01, 0.05, 0.1\}$. Unless a hyperparameter is varied, the 'default' value identified on the validation set is used for the number of layers and loss balancing weight, and 2000 for the query term vocabulary size. For the Naver and MovieLens datasets, the default number of layers is respectively 2 and 3, and on both datasets the default loss balancing weight is 0.01.

In FIGS. 4A and 4B, trends across search instances and recommendation instances are observed for the different varied hyperparameters. First, the number of layers is more impactful on recommendation instances than on search instances, although in both cases increasing the number of

TABLE 3

| | Naver | | | MovieLens | | |
|---|---|---|---|---|---|---|
| Model | HR@1 | HR@10 | HR@20 | HR@1 | HR@10 | HR@20 |
| MF | 0.0063 ± 0.0002 | 0.0431 ± 0.0004 | 0.0720 ± 0.0004 | 0.0019 ± 0.0001 | 0.0156 ± 0.0004 | 0.0275 ± 0.0005 |
| LightGCN | 0.0078 ± 0.0000 | 0.0501 ± 0.0002 | 0.0821 ± 0.0002 | 0.0022 ± 0.0001 | 0.0189 ± 0.0003 | 0.0331 ± 0.0005 |
| FM | 0.1199 ± 0.0003 | 0.3890 ± 0.0003 | 0.4823 ± 0.0006 | 0.0154 ± 0.0001 | 0.0856 ± 0.0002 | 0.1284 ± 0.0005 |
| DeepFM | 0.1207 ± 0.0005 | 0.3932 ± 0.0013 | 0.4871 ± 0.0008 | 0.0165 ± 0.0002 | 0.0898 ± 0.0004 | 0.1329 ± 0.0004 |
| JSR | 0.1912 ± 0.0003 | 0.5238 ± 0.0005 | 0.5967 ± 0.0003 | 0.0088 ± 0.0001 | 0.0643 ± 0.0003 | 0.1002 ± 0.0005 |
| BM25 | 0.1393 ± 0.0000 | 0.5049 ± 0.0000 | 0.6023 ± 0.0000 | 0.0068 ± 0.0000 | 0.0598 ± 0.0000 | 0.1201 ± 0.0000 |
| HyperSaR | 0.2093 ± 0.0003† | 0.5572 ± 0.0002† | 0.6317 ± 0.0002† | 0.0441 ± 0.0003† | 0.1687 ± 0.0002† | 0.2202 ± 0.0003† |
| Improv./p | 9.47%/2.94e−10 | 6.38%/2.27e−11 | 4.88%/1.63e−14 | 167.27%/1.60e−12 | 87.86%/1.23e−15 | 65.69%/1.69e−15 |

Among the approaches which utilize queries, the HyperSaR HGCN outperformed all other models. On the Naver dataset, JSR performed second best, similarly to BM25 on HR@20, and is improved over by the HyperSaR HGCN by 4.88% to 9.47%. The margin between the HyperSaR HGCN and other approaches is larger on the MovieLens dataset, where the improvements range from 65.69% to 167.27% over the second-best performing approach, DeepFM.

After validating the HyperSaR HGCN's recommendation and search performance, how hyperparameters impact the HyperSaR HGCN model's results is analyzed. In particular, three hyperparameters are studied: (i) the number of layers, (ii) the query term vocabulary size, and (iii) the loss ballayers improves performance. On both datasets, a plateau may be reached around 2 or 3 layers. In contrast, the number of query terms may have greater impact on search instances than on recommendation instances considering more query terms may imply a greater coverage of the query content. A performance plateau at 5000 or 10000 query terms is nonetheless observed, so further increasing the query term vocabulary size may not be beneficial.

Finally, looking at the plots related to the loss balancing weight $\eta$, different behaviors are noted across the Naver and MovieLens datasets. On the Naver dataset, a value around 0.01 may be optimal for both search and recommendation performance. However, on the MovieLens dataset, increasing $\eta$ may result in improved search performance and degraded recommendation performance. This could be due to the different nature of the datasets—one is based on true search and recommendation interactions, while the other includes rating and tagging interactions. The latter results confirm that the query likelihood loss can benefit the Hyper-SaR HGCN model even though it may in some cases imply trading off between search and recommendation performance.

Although the context of method functions is provided above, the functions also represent a description of and are performed by a corresponding component, module or feature of a corresponding apparatus or system. Some or all of the method functions may be implemented by a computing device in that they are executed by (or using) one or more processors, microprocessors, electronic circuits, or processing circuitry.

Generally, embodiments can be implemented as a computer program product with a program code or computer-executable instructions, the program code or computer-executable instructions being operative for performing one of the methods when the computer program product runs on a computing device. The program code or the computer-executable instructions may, for example, be stored in memory.

In various implementations, memory includes, stored thereon, the computer program or the computer-executable instructions for performing one of the methods described herein when it is performed by one or more processors. In a further embodiment, an apparatus includes the one or more processors and the memory mentioned above.

In various implementations, an apparatus includes perform the methods described herein. A further embodiment includes a computing device having installed thereon the computer program or instructions for performing one of the methods described herein.

Figure 5:
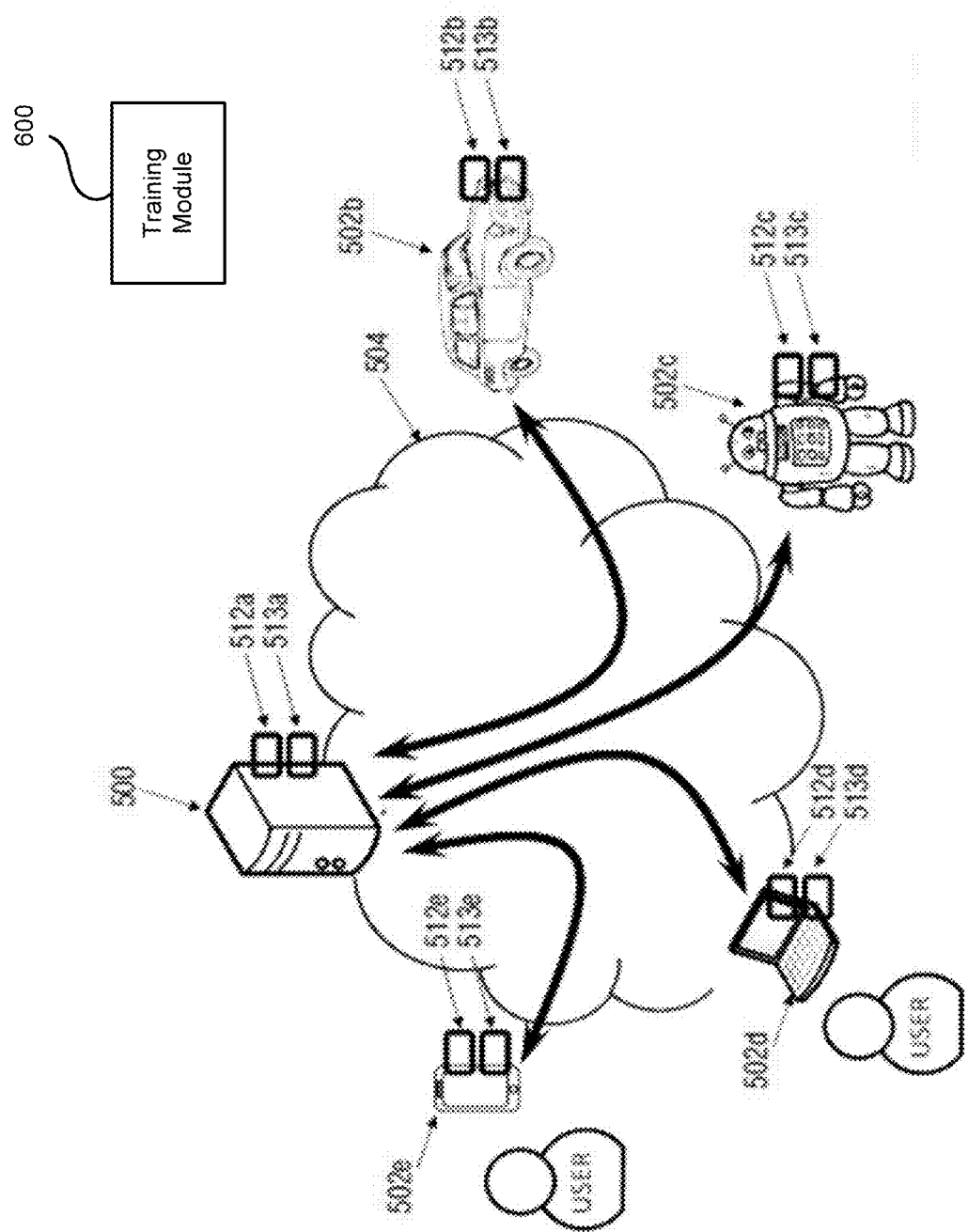
FIG. 5 illustrates an example of architecture (environment) in which the disclosed systems and methods may be performed.

The above-mentioned methods and embodiments may be implemented within an architecture, such as illustrated in FIG. 5, which includes server 500 and one or more computing devices generally referenced as 502 that communicate over a network 504 (which may be wireless and/or wired) such as the Internet for data exchange. The server 500 and the computing devices 502 each include one or more processors 512 and memory 513. The computing devices 502 may be any type of computing device that communicates with the server 500, such as an autonomous vehicle 502*b*, robot 502*c*, computer 502*d*, or cell phone 502*e*, or another type of computing device.

In various implementations, the techniques described herein may be performed at the server 500. In other embodiments, the techniques described herein may be performed at the computing device 502. In various implementations, the techniques described herein may be performed at a different server or on a plurality of servers in a distributed manner.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented method of training a hypergraph convolutional network (HGCN) to retrieve items, the method comprising:
   receiving training data including search instances and recommendation instances,
   each of the search instances including (a) a user profile, (b) a query comprising one or more query terms, and (c) an item, and
   each of the recommendation instances including (a) a user profile and (b) an item;
   constructing a hypergraph from the training data,
   wherein each node of the hypergraph represents one of a user profile, a query term, and a content item, and
   wherein the hypergraph represents each of the search instances and each of the recommendation instances as a hyperedge linking corresponding ones of the nodes;
   initializing base embeddings associated with the hypergraph nodes to constitute a base layer of the HGCN;
   propagating the base embeddings through one or more convolutional layers of the HGCN to obtain, for each of the convolutional layers, respective embeddings of the nodes of the hypergraph;
   computing, based on the base embeddings and the respective embeddings obtained from each of the one or more convolutional layers:
      a first loss determined based on a prediction by the HGCN of an item based on a corresponding user profile and query; and
      a second loss determined based on a prediction by the HGCN of a query based on a corresponding user profile and item; and
   selectively updating at least one of the base embeddings of the HGCN based on the first loss and the second loss.

2. The method of claim 1 further comprising:
   aggregating the base embeddings and the embeddings obtained from each of the one or more convolutional layers using a convex combination of the embeddings,
   wherein computing the first loss and the second loss includes computing the first loss and the second loss based on the aggregation of the base embeddings and the embeddings obtained from each of the one or more convolutional layers.

3. The method of claim 1 wherein computing the first loss includes computing the first loss based on a query embedding from a sum of the embeddings of query terms of the query.

4. The method of claim 1 wherein computing the first loss includes computing the first loss using one of a Bayesian Personalized Ranking loss and a pointwise cross-entropy loss.

5. The method of claim 1 wherein computing the second loss includes computing the second loss based on a sum of (a) a first loss associated with the prediction of the query based on the corresponding user profile and (b) a second loss associated with a prediction of the query based on the corresponding item.

6. The method of claim 1 wherein the base embeddings include, for each of the recommendation instances, an all-zero vector, matrix, or value representing an absent query.

7. The method of claim 1 wherein:
   the base embeddings include, for each of the recommendation instances, an embedding representing non-inclusion of a query in the recommendation instances; and
   the embedding is equal to a mean of the embeddings of the query terms of the training data.

8. The method of claim 1 wherein the base embeddings each include a randomly initialized and trainable embedding representing an absent query, which is shared across the recommendation instances.

9. The method of claim 1 wherein the HGCN comprises two or more convolutional layers with different levels of connections between user profiles and items.

10. The method of claim 1 further comprising, for each of the search instances, determining one or more query terms by comparing a query to a database of query terms.

11. The method of claim 1 wherein the item is one of an image, audio, and video.

12. The method of claim 1 wherein initializing the base embeddings includes initializing base embeddings randomly.

13. The method of claim 1, wherein each user profile includes a unique user identifier of a user and at least one of a username, a location of the user, and demographic information associated with the user.

14. A method for ranking items comprising:
by one or more processors, receiving a hypergraph convolutional network (HGCN) trained according to the method of claim 1;
by one or more processors, receiving, from a computing device via a network, an input including one of (a) a user profile and (b) a user profile and a query;
by the one or more processors, obtaining based on the input, from memory, a plurality of items;
processing, by the trained HGCN, the items and the input including one of (a) the user profile and (b) the user profile and the query thereby determining scores for the items, respectively;
by the one or more processors, ranking the items based on the scores, respectively; and
by the one or more processors, transmitting the items ranked according to the score to the computing device.

15. A method of ranking items, the method comprising:
by one or more processors, receiving, from a computing device via a network, an input including one of (a) a user profile and (b) a user profile and a query;
by the one or more processors, obtaining based on the input, from memory, a plurality of items;
processing, by a trained hypergraph convolutional network (HGCN), the items and the input including one of (a) the user profile and (b) the user profile and the query thereby determining scores for the items, respectively, wherein the HGCN includes a hypergraph,
each node of the hypergraph representing one of a user profile, a query term, and an item; and
the hypergraph representing each of a plurality of search instances and each of a plurality of recommendation instances as a hyperedge linking corresponding ones of the nodes;
by the one or more processors, ranking the items based on the scores, respectively; and
by the one or more processors, transmitting the items ranked according to the score to the computing device.

16. The method of claim 15, wherein the user profile includes a unique user identifier of a user and at least one of a username, a location of the user, and demographic information associated with the user.

17. The method of claim 15 wherein the input includes (b) the user profile and the query.

18. The method of claim 15 wherein the HGCN includes two or more convolutional layers with different levels of connections between user profiles and items.

19. The method of claim 15 wherein the items each include one of an image, audio, and video.

20. The method of claim 15 wherein the input includes (a) the user profile and does not include a query.

21. The method of claim 15 wherein the HGCN is trained using training data including search instances and recommendation instances, where each of the search instances includes (a) a user profile, (b) a query comprising one or more query terms, and (c) an item, and where each of the recommendation instances includes (a) a user profile and (b) an item.

22. The method of claim 20 wherein the HGCN is trained based on:
a first loss determined based on a prediction by the HGCN of an item based on a corresponding user profile and query; and
a second loss determined based on a prediction by the HGCN of a query based on a corresponding user profile and item.

23. A training system, comprising:
a training module configured to:
receive training data including search instances and recommendation instances,
each of the search instances including (a) a user profile, (b) a query comprising one or more query terms, and (c) an item, and
each of the recommendation instances including (a) a user profile and (b) an item;
a hypergraph convolutional neural network (HGCN) configured to:
construct a hypergraph from the training data,
wherein each node of the hypergraph represents one of a user profile, a query term, and a content item, and
wherein the hypergraph represents each of the search instances and each of the recommendation instances as a hyperedge linking corresponding ones of the nodes,
wherein the training module is further configured to initialize base embeddings of the HGCN;
wherein the HGCN is configured to propagate the base embeddings through one or more convolutional layers of the HGCN to obtain, for each of the convolutional layers, respective embeddings of the nodes of the hypergraph; and
wherein the training module is further configured to:
based on the base embeddings and the respective embeddings obtained from each of the one or more convolutional layers:
a first loss determined based on a prediction by the HGCN of an item based on a corresponding user profile and query; and
a second loss determined based on a prediction by the HGCN of a query based on a corresponding user profile and item; and
selectively update at least one of the base embeddings of the HGCN based on the first loss and the second loss.

24. A method of ranking items, the method comprising:
by one or more processors, receiving, from a computing device via a network, an input including one of (a) a user profile and (b) a user profile and a query;
by the one or more processors, obtaining based on the input, from memory, a plurality of items;
processing, by a trained hypergraph convolutional network (HGCN), the items and the input including one of (a) the user profile and (b) the user profile and the query thereby determining scores for the items, respectively,
wherein the HGCN is trained based on:
a first loss determined based on a prediction by the HGCN of an item based on a corresponding user profile and query; and a second loss determined based on a prediction by the
HGCN of a query based on a corresponding user
profile and item;

by the one or more processors, ranking the items based on
the scores, respectively; and by the one or more processors, transmitting the items
ranked according to the score to the computing device.

* * * * *